(12) United States Patent
Chen et al.

(10) Patent No.: US 8,549,354 B2
(45) Date of Patent: Oct. 1, 2013

(54) MANAGING ROLLBACK IN A TRANSACTIONAL MEMORY ENVIRONMENT

(75) Inventors: Wen-Tzer T. Chen, Austin, TX (US); Diane G. Flemming, Pflugerville, TX (US); William A. Maron, Austin, TX (US); Mysore S. Srinivas, Austin, TX (US); David B. Whitworth, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 177 days.

(21) Appl. No.: 13/113,663

(22) Filed: May 23, 2011

(65) Prior Publication Data

US 2012/0304002 A1 Nov. 29, 2012

(51) Int. Cl.
*G06F 11/00* (2006.01)

(52) U.S. Cl.
USPC ............................................. 714/19; 714/18

(58) Field of Classification Search
USPC .............................. 714/19, 18, 20, 21, 15, 16
See application file for complete search history.

(56) References Cited

U.S. PATENT DOCUMENTS

| 7,730,286 | B2 | | 6/2010 | Peterson et al. | |
| 8,032,736 | B2 * | 10/2011 | Abrashkevich et al. | ...... | 712/228 |
| 2003/0123175 | A1 * | 7/2003 | Gill et al. | ........................ | 360/53 |
| 2006/0242297 | A1 * | 10/2006 | Aronoff et al. | ............... | 709/225 |
| 2007/0255678 | A1 | | 11/2007 | Majumdar | |
| 2009/0217018 | A1 | | 8/2009 | Abrashkevich et al. | |
| 2011/0029490 | A1 | | 2/2011 | Agarwal et al. | |

OTHER PUBLICATIONS

Waliullah, M. M. et al.; Intermediate Checkpointing with Conflicting Access Prediction in Transactional Memory Systems; Proceedings of the 22nd IEEE International Parallel and Distributed Processing Symposium; 2008; pp. 1-15.

* cited by examiner

*Primary Examiner* — Dieu-Minh Le
(74) *Attorney, Agent, or Firm* — James L. Baudino; Matthew B. Talpis

(57) ABSTRACT

A system and technique for managing rollback in a transactional memory environment is disclosed. The system includes a processor, a transactional memory, and a transactional memory manager (TMM) configured to perform a rollback on the transactional memory. The TMM is configured to, responsive to detecting a begin transaction directive by the processor, detect an access of a first memory location of the transactional memory not needing rollback and indicate that the first memory location does not need to be rolled back while detecting an access to a second memory location of the transactional memory and indicating that a rollback will be required. The TMM is also configured to, responsive to detecting an end transaction directive after the begin transaction directive and a conflict requiring a rollback, omit a rollback of the first memory location while performing rollback on the second memory location.

13 Claims, 4 Drawing Sheets

MANAGING ROLLBACK IN A TRANSACTIONAL MEMORY ENVIRONMENT

BACKGROUND

Transactional memory environments accommodate parallel programming by allowing a group of load and store instructions to execute in an atomic way. Generally, transactional memory is a concurrency control mechanism analogous to database transactions for controlling access to shared memory in concurrent computing. Locking techniques may be used in multithreaded applications to reduce the likelihood of a transaction conflict. Transactions conflict when two or more transactions access the same block of memory, and at least one of those accesses is a write access. If a transaction completes without a conflict, at the conclusion of a transaction, all memory changes are made permanent in an operation often referred to as a commit. However, if a conflict occurred, prior changes to memory performed by the transaction need to be rolled back or undone.

BRIEF SUMMARY

According to one aspect of the present disclosure a system and technique for managing rollback in a transactional memory environment is disclosed. The system includes a processor, a transactional memory, and a transactional memory manager configured to perform a rollback on the transactional memory. The transactional memory manager is configured to, responsive to detecting a begin transaction directive by the processor, detect an access of a first memory location not needing rollback and indicate that the first memory location does not need to be rolled back while detecting an access to a second memory location and indicating that a rollback will be required. The transactional memory manager is also configured to, responsive to detecting an end transaction directive after the begin transaction directive and a conflict requiring a rollback, omit a rollback of the first memory location while performing rollback on the second memory location.

BRIEF DESCRIPTION OF THE SEVERAL VIEWS OF THE DRAWINGS

For a more complete understanding of the present application, the objects and advantages thereof, reference is now made to the following descriptions taken in conjunction with the accompanying drawings, in which.

DETAILED DESCRIPTION

Figure 1:
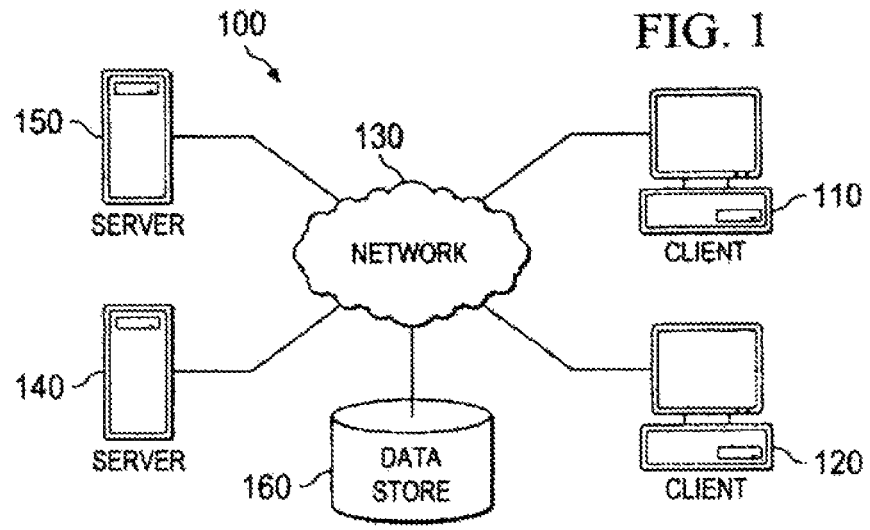
FIG. 1 is an embodiment of a network of data processing systems in which the illustrative embodiments of the present disclosure may be implemented.

Embodiments of the present disclosure provide a method, system and computer program product for managing rollback in a transactional memory environment. For example, in some embodiments, the method and technique includes, responsive to detecting a begin transaction directive by a processor supporting transactional memory processing, detecting an access of a first memory location not needing rollback and indicating that the first memory location does not need to be rolled back while detecting an access to a second memory location and indicating that a rollback will be required. The method also includes, responsive to detecting an end transaction directive after the begin transaction directive and a conflict requiring a rollback, omitting a rollback of the first memory location while performing rollback on the second memory location. Thus, in some embodiments of the present disclose, memory locations not needing rollback are identified such that, in response to detecting a conflict and processing a rollback operation, the rollback process omits rolling back of the memory locations identified as not needing rollback, thereby streamlining the rollback process and utilizing less cache for preserving affected values needing rollback.

As will be appreciated by one skilled in the art, aspects of the present disclosure may be embodied as a system, method or computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present disclosure may take the form of a computer program product embodied in one or more computer readable medium(s) having computer readable program code embodied thereon.

Any combination of one or more computer usable or computer readable medium(s) may be utilized. The computer readable medium may be a computer readable signal medium or a computer readable storage medium. A computer readable storage medium may be, for example but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described below with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

Figure 2:
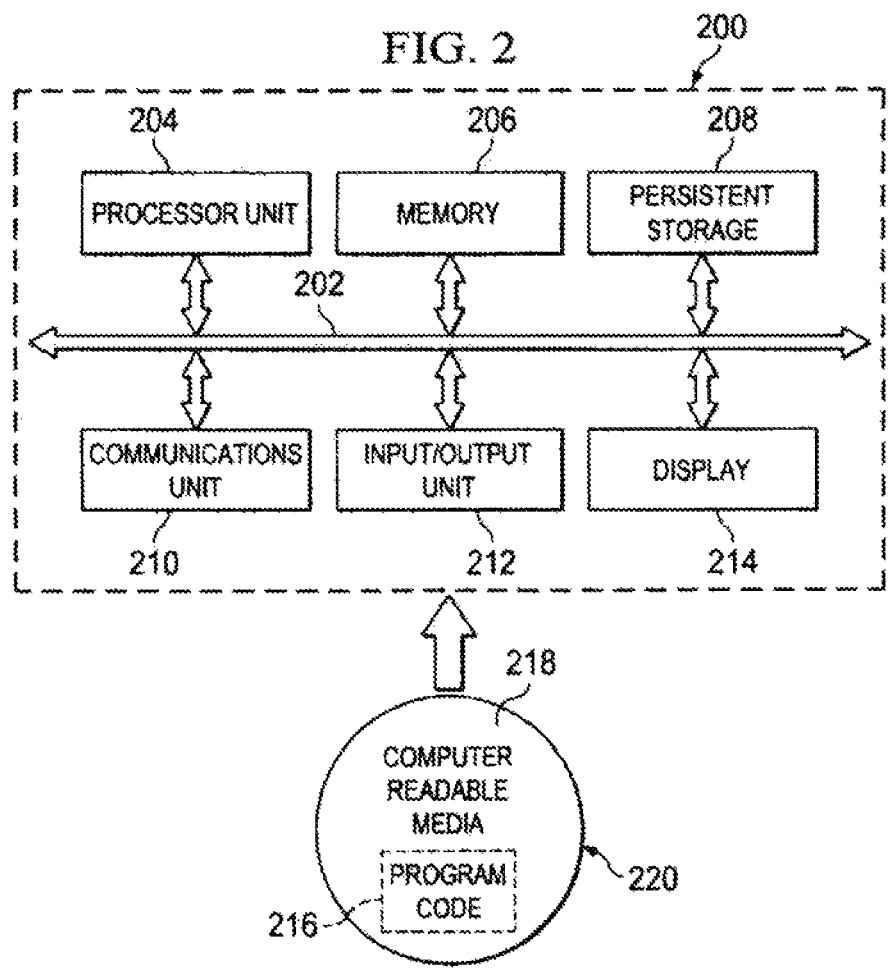
FIG. 2 is an embodiment of a data processing system in which the illustrative embodiments of the present disclosure may be implemented.

With reference now to the Figures and in particular with reference to FIGS. 1-2, exemplary diagrams of data processing environments are provided in which illustrative embodiments of the present disclosure may be implemented. It should be appreciated that FIGS. 1-2 are only exemplary and are not intended to assert or imply any limitation with regard to the environments in which different embodiments may be implemented. Many modifications to the depicted environments may be made.

FIG. 1 is a pictorial representation of a network of data processing systems in which illustrative embodiments of the present disclosure may be implemented. Network data processing system 100 is a network of computers in which the illustrative embodiments of the present disclosure may be implemented. Network data processing system 100 contains network 130, which is the medium used to provide communications links between various devices and computers connected together within network data processing system 100. Network 130 may include connections, such as wire, wireless communication links, or fiber optic cables.

In some embodiments, server 140 and server 150 connect to network 130 along with data store 160. Server 140 and server 150 may be, for example, IBM System p® servers. In addition, clients 110 and 120 connect to network 130. Clients 110 and 120 may be, for example, personal computers or network computers. In the depicted example, server 140 provides data and/or services such as, but not limited to, data files, operating system images, and applications to clients 110 and 120. Network data processing system 100 may include additional servers, clients, and other devices.

In the depicted example, network data processing system 100 is the Internet with network 130 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, network data processing system 100 also may be implemented as a number of different types of networks, such as for example, an intranet, a local area network (LAN), or a wide area network (WAN). FIG. 1 is intended as an example, and not as an architectural limitation for the different illustrative embodiments.

FIG. 2 is an embodiment of a data processing system 200 such as, but not limited to, client 110 and/or server 140 in which an embodiment of a data transfer management system according to the present disclosure may be implemented. In this embodiment, data processing system 200 includes a bus or communications fabric 202, which provides communications between processor unit 204, memory 206, persistent storage 208, communications unit 210, input/output (I/O) unit 212, and display 214.

Processor unit 204 serves to execute instructions for software that may be loaded into memory 206. Processor unit 204 may be a set of one or more processors or may be a multiprocessor core, depending on the particular implementation. Further, processor unit 204 may be implemented using one or more heterogeneous processor systems in which a main processor is present with secondary processors on a single chip. As another illustrative example, processor unit 204 may be a symmetric multi-processor system containing multiple processors of the same type.

In some embodiments, memory 206 may be a random access memory or any other suitable volatile or non-volatile storage device. Persistent storage 208 may take various forms depending on the particular implementation. For example, persistent storage 208 may contain one or more components or devices. Persistent storage 208 may be a hard drive, a flash memory, a rewritable optical disk, a rewritable magnetic tape, or some combination of the above. The media used by persistent storage 208 also may be removable such as, but not limited to, a removable hard drive.

Communications unit 210 provides for communications with other data processing systems or devices. In these examples, communications unit 210 is a network interface card. Modems, cable modem and Ethernet cards are just a few of the currently available types of network interface adapters. Communications unit 210 may provide communications through the use of either or both physical and wireless communications links.

Input/output unit 212 enables input and output of data with other devices that may be connected to data processing system 200. In some embodiments, input/output unit 212 may provide a connection for user input through a keyboard and mouse. Further, input/output unit 212 may send output to a printer. Display 214 provides a mechanism to display information to a user.

Instructions for the operating system and applications or programs are located on persistent storage 208. These instructions may be loaded into memory 206 for execution by processor unit 204. The processes of the different embodiments may be performed by processor unit 204 using computer implemented instructions, which may be located in a memory, such as memory 206. These instructions are referred to as program code, computer usable program code, or computer readable program code that may be read and executed by a processor in processor unit 204. The program code in the different embodiments may be embodied on different physical or tangible computer readable media, such as memory 206 or persistent storage 208.

Program code 216 is located in a functional form on computer readable media 218 that is selectively removable and may be loaded onto or transferred to data processing system 200 for execution by processor unit 204. Program code 216 and computer readable media 218 form computer program product 220 in these examples. In one example, computer readable media 218 may be in a tangible form, such as, for example, an optical or magnetic disc that is inserted or placed into a drive or other device that is part of persistent storage 208 for transfer onto a storage device, such as a hard drive that is part of persistent storage 208. In a tangible form, computer readable media 218 also may take the form of a persistent storage, such as a hard drive, a thumb drive, or a flash memory that is connected to data processing system 200. The tangible form of computer readable media 218 is also referred to as computer recordable storage media. In some instances, computer readable media 218 may not be removable.

Alternatively, program code 216 may be transferred to data processing system 200 from computer readable media 218 through a communications link to communications unit 210 and/or through a connection to input/output unit 212. The communications link and/or the connection may be physical or wireless in the illustrative examples.

The different components illustrated for data processing system 200 are not meant to provide architectural limitations to the manner in which different embodiments may be implemented. The different illustrative embodiments may be implemented in a data processing system including components in addition to or in place of those illustrated for data processing system 200. Other components shown in FIG. 2 can be varied from the illustrative examples shown. For example, a storage device in data processing system 200 is any hardware apparatus that may store data. Memory 206, persistent storage 208, and computer readable media 218 are examples of storage devices in a tangible form.

Figure 3:
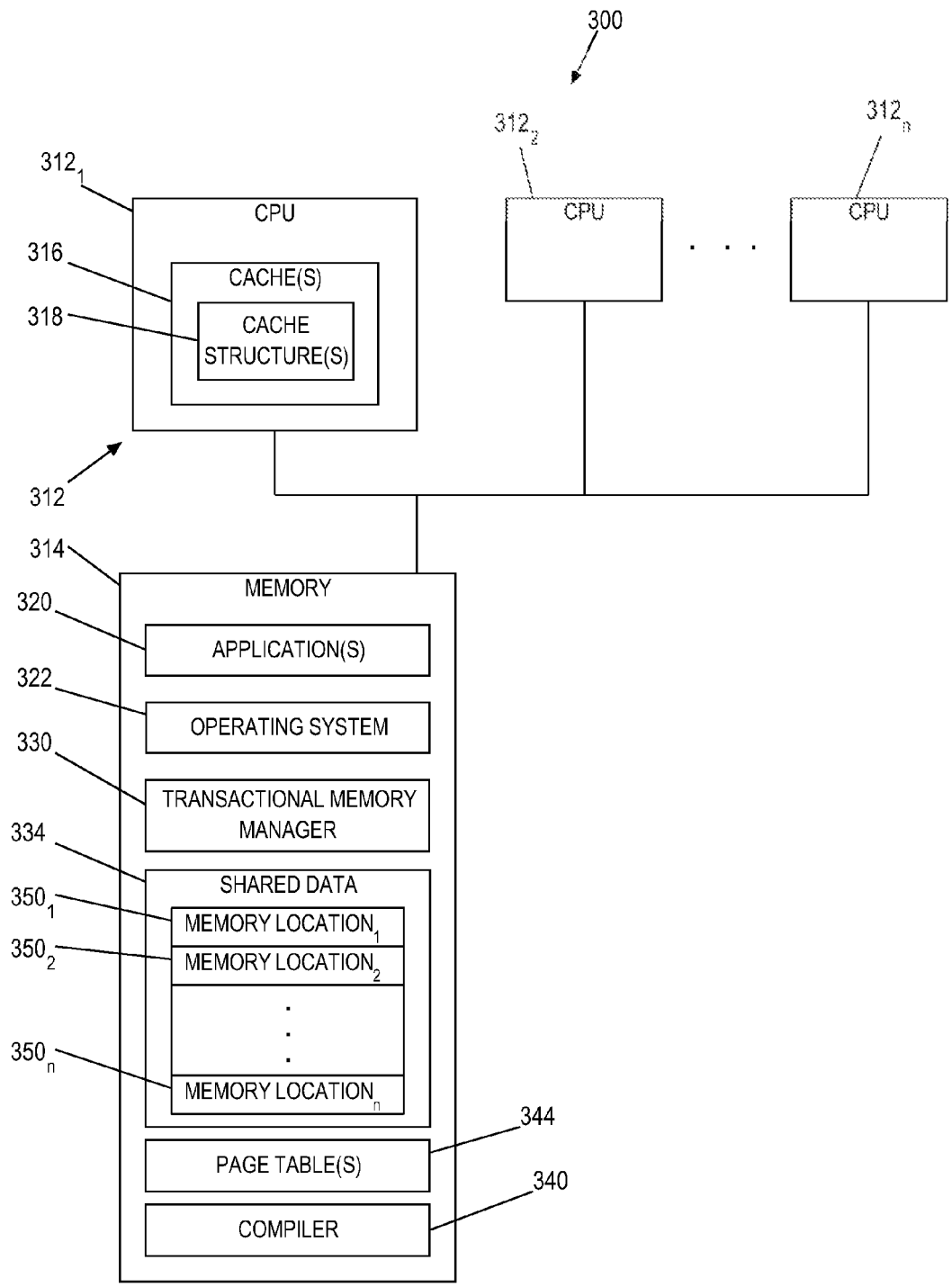
FIG. 3 is a diagram illustrating an embodiment of a data processing system for managing rollback in a transactional memory environment in which illustrative embodiments of the present disclosure may be implemented.

FIG. 3 is an illustrative embodiment of a system 300 for managing rollback in a transactional memory environment. System 300 may be implemented on data processing systems or platforms such as, but not limited to, servers 140 and/or 150, clients 110 and/or 120, or at other data processing system locations. In the embodiment illustrated in FIG. 3, system 300 comprises one or more central processing units (CPUs) or processors 312 coupled to a system memory 314. Each of processors $312_1$, $312_2$ through $312_n$ includes a cache(s) 316 having a cache structure 318 for storing data states associated with a particular processing transaction, data (including instructions) that are utilized by one or more components of a particular processor 312 or other types of information. Cache (s) 316 may include one or more of a level 2 (L2) cache, a level 1 (L1) cache or other type of cache structure. In some embodiments, cache structure 318 is a hardware buffer containing cache lines.

In the embodiment illustrated in FIG. 3, memory 314 comprises a shared memory that may be shared by a variety of different resources in a transactional memory environment. For example, in the illustrated embodiment, memory 314 includes one or more application(s) 320 and an operating system 322. Application(s) 320 may include any type of application that may include, in some embodiments, multiple execution threads. For example, in some embodiments, a particular process may have multiple threads where each thread may include its own stack space and may execute independently of other threads. Thread management and/or scheduling may be performed by application(s) 320 or operating system 322. In FIG. 3, application(s) 320 and operating system 322 are stored in memory 314; however, it should be understood that application(s) 320 and/or operating system 322 may be stored elsewhere. It should also be understood that each of processors $312_1$, $312_2$ through $312_n$ may share access to memory 314.

In the embodiment illustrated in FIG. 3, system 300 includes a transactional memory manager (TMM) 330. TMM 330 implements updates to shared data 334 as serialized transactions. Each transaction either completes successfully without conflict with other transactions, in which case the transaction is committed, or it does not complete, in which case the transaction is aborted and a rollback is performed. A rollback is performed by reverting the transaction state changes and reclaiming the memory locations used to hold uncommitted data written during a transaction. TMM 330 may be implemented in any suitable manner using known transactional memory techniques that may be hardware-based, software-based, or some combination of both. For example, TMM 330 may comprise software, logic and/or executable code for performing various functions as described herein (e.g., residing as software and/or an algorithm running on a processor unit, hardware logic residing in a processor or other type of logic chip, centralized in a single integrated circuit or distributed among different chips in a data processing system).

Accordingly, TMM 330 may include several functional components including, but not limited to, a transaction processing component and a rollback component. For example, the transaction processing component of TMM 330 may be used to implement the load and store instructions that operate on shared memory values that have been read and written during a transaction and/or to manage a transaction state (e.g., whether the transaction commits or fails). The rollback component of TMM 330 manages transaction rollback and the reclamation of memory associated with uncommitted transaction data following a transaction abort. For example, a transaction will generally commit if no other transaction has updated any memory location in the transaction's read or write values, and no other transaction has read any location in the transaction's write values. Thus, TMM 330 generally includes a conflict detection function. For example, if a conflict is detected, the transaction aborts and changes to the transaction's write values are discarded. If no conflict is detected, the transaction's changes to shared data 334 are finalized.

In the embodiment illustrated in FIG. 3, memory 314 includes a compiler 340 for compiling code and one or more page tables 344 for mapping virtual memory addresses to physical memory addresses. Although in FIG. 3 page table(s)

344 are illustrated as being stored in memory 314, it should be understood that page table(s) 344 may be located elsewhere. Further, it should be understood that a translation lookaside buffer (TLB) may be used to cache the most recently used page table entries with processors 312.

In operation, TMM 330 is configured to indicate that certain memory locations will not need rollback if a conflict is detected. For example, in the embodiment illustrated in FIG. 3, shared data 334 includes memory locations $350_{1-n}$. TMM 330 is configured to mark, flag and/or otherwise indicate that certain memory locations $350_{1-n}$ will not need rollback if a conflict is detected. For example, in some embodiments, local variables or constant data types/values (e.g., a data value representing the speed of sound) do not need rollback care such that during a rollback process, the memory locations containing such values do not need to be reverted back to the original values. Thus, during a rollback process, TMM 330 may omit rolling back certain memory locations $350_{1-n}$, thereby resulting in less data being pushed to cache(s) 316 and/or memory 314.

In some embodiments, TMM 330 determines whether to flag or indicate that a certain memory location $350_{1-n}$ will not need rollback as data is being read into page table(s) 344 and/or cache(s) 316. For example, in some embodiments, a preprocessor or compiler directive may be used to identify a particular data type as data not needing rollback. In this embodiment, in C or C++ programming language for example, an integer directive (e.g., "int") may be used to identify a particular integer value as a constant or static value (e.g., "staticint" or "constint") such that the directive indicates that the particular value does not need rollback. Thus, in this embodiment, as the data is being read into page table(s) 344 and/or cache(s) 316, the compiler directive may be used to identify by compiler 340 a particular data type as not needing rollback such that TMM 330 flags the corresponding memory location $350_{1-n}$ in page table(s) 344 and/or cache(s) 316 as not needing rollback.

In another embodiment, when loading data into memory 314, certain data (e.g., particular data values, memory locations 350 and/or an entire dataset) may be identified and/or defined in memory 314 as not needing rollback. Thus, in this embodiment, when loading shared data 334 into memory 314, the data is identified or flagged as data not needing rollback. The types of data may include, but not be limited to, constant or static values or any other type of value not needing rollback processing. Thus, in some embodiments, when reading shared data 334 from memory 314 that has been identified and/or defined in memory 314 as not needing rollback, the read data is flagged as not needing rollback by TMM 330 (e.g., in page table(s) 344 and/or cache(s) 316). In some embodiments, operating system 322 and/or application(s) 320 identify and/or keep track of such data as data not needing rollback such that when accessed by TMM 330, TMM 330 flags the data not needing rollback. The data may also be defined in programming for a particular transaction as being data not needing rollback.

In operation, at a BEGIN TRANSACTION directive issued by processor(s) 312, a rollback point is established. At the END TRANSACTION point of the transaction, in response to determining that a conflict has occurred, TMM 330 initiates a rollback process. TMM 330 accesses page table(s) 344 and/or cache(s) 316 and identifies certain memory locations 350 as not needing rollback based on flags contained in page table(s) 344 and/or cache(s) 316 and omits rollback of such memory locations 350 while performing rollback on remaining memory locations 350 for memory locations 350 in page table(s) 344 and/or cache(s) 316 not flagged as not needing rollback.

Figure 4:
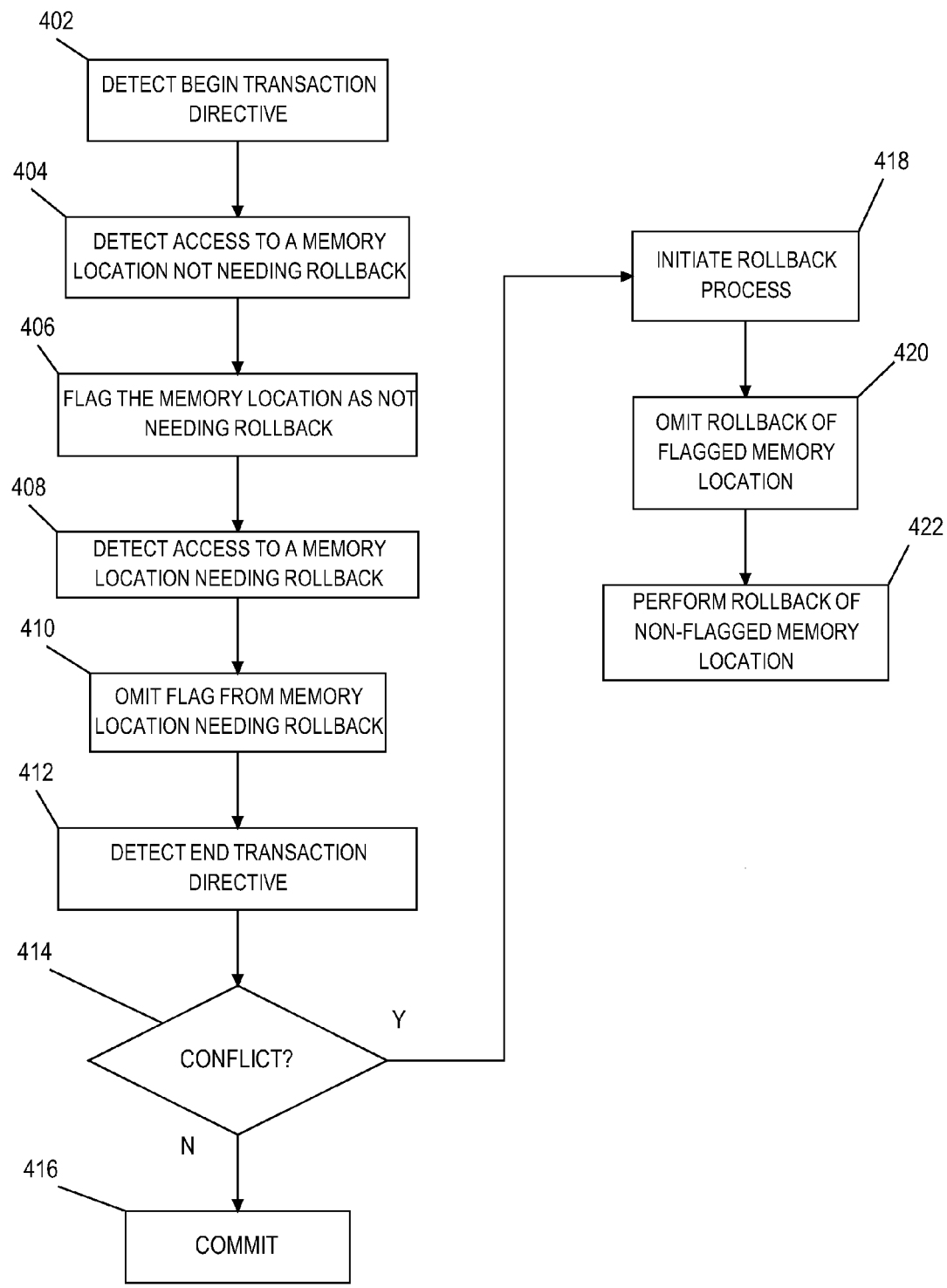
FIG. 4 is a flow diagram illustrating an embodiment of a method for managing rollback in a transactional memory environment.

FIG. 4 is a flow diagram illustrating an embodiment of a method for managing rollback in a transactional memory environment. The method begins at block 402, where a BEGIN TRANSACTION directive is received from processor(s) 312. At block 404, TMM 330 detects access to one of memory locations $350_{1-n}$ not needing rollback. At block 406, TMM 330 flags the designated memory location $350_{1-n}$ as not needing rollback. At block 408, TMM 330 detects access to another one of memory locations $350_{1-n}$ needing rollback in the event of a conflict. At block 410, TMM 330 omits flagging the designated memory location $350_{1-n}$ as not needing rollback. At block 412, an END TRANSACTION directive is received.

At decisional block 414, TMM 330 determines whether a conflict occurred during transaction processing. If not, the method proceeds to block 416, where the transaction commits. If a conflict occurred, the method proceeds to block 418, where TMM 330 initiates a rollback process. At block 420, TMM 330 omits rollback of flagged memory location $350_{1-n}$ where the flag represents a designation that such memory location $350_{1-n}$ does not need rollback. At block 422, TMM 330 performs rollback of non-flagged memory location $350_{1-n}$ (i.e., where a lack of a flag indicates that rollback is needed).

Figure 5:
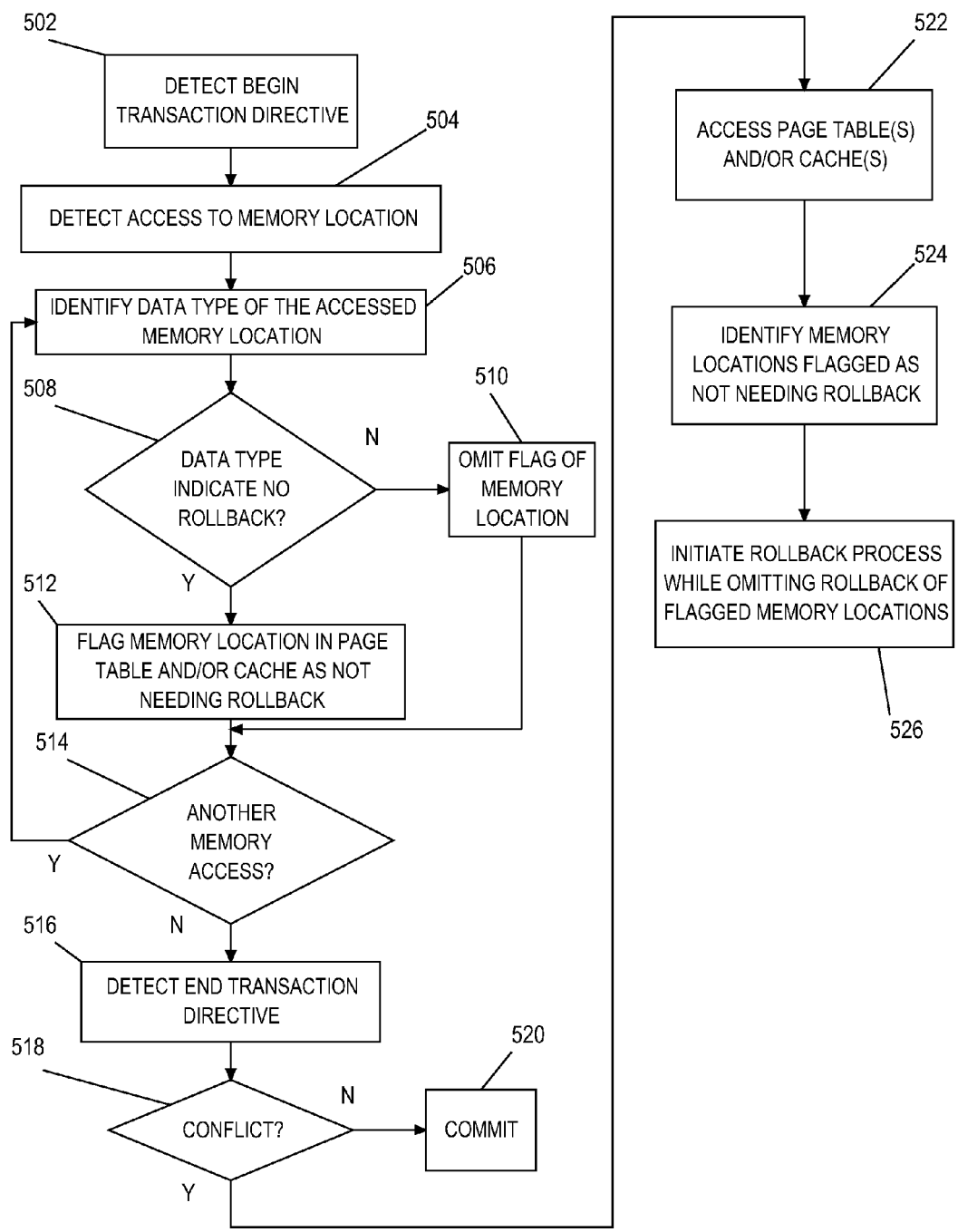
FIG. 5 is a flow diagram illustrating another embodiment of a method for managing rollback in a transactional memory environment.

FIG. 5 is a flow diagram illustrating an embodiment of a method for managing rollback in a transactional memory environment. The method begins at block 502, where a BEGIN TRANSACTION directive is received from processor(s) 312. At block 504, TMM 330 detects access to one of memory locations $350_{1-n}$. At block 506, TMM 330 determines and/or otherwise identifies a data type of the accessed memory location $350_{1-n}$. At decisional block 508, a determination is made by TMM 330 whether the identified data type indicates that rollback of the accessed memory location $350_{1-n}$ is not needed. If the identified data type indicates that rollback is needed, the method proceeds to block 510, where TMM 330 omits flagging of the accessed memory location $350_{1-n}$. If the data type indicates that rollback is not needed, the method proceeds to block 512, where TMM 330 flags the accessed memory location $350_{1-n}$ as not needing rollback in page table(s) 344 and/or cache(s) 316.

At decisional block 514, a determination is made whether another memory location $350_{1-n}$ has been accessed. If so, the method proceeds to block 506. If not, the method proceeds to block 516, where an END TRANSACTION directive is detected. At decisional block 518, TMM 330 determines whether a conflict occurred during transaction processing. If not, the method proceeds to block 520, where the transaction commits. If a conflict occurred, the method proceeds to block 522, where TMM 330 accesses page table(s) 344 and/or cache(s) 316. At block 524, TMM 330 identifies flagged memory locations $350_{1-n}$ not needing rollback. At block 526, TMM 330 initiates a rollback process while omitting rollback of memory locations $350_{1-n}$ flagged as not needing rollback.

Thus, embodiments of the present disclosure enable a more efficient rollback process of a transactional memory environment by omitting rollback of particular memory locations that have been designated as not needing rollback. For example, embodiments of the present disclosure enable certain shared memory locations to be flagged as not needing rollback. The determination that certain shared memory locations will not need rollback may be based on, for example, but not limited to, the data type of the memory location, a compiler directive indicating that the data of the particular memory location does not need rollback, or a designation when data is loaded into the shared memory. Thus, embodiments of the present disclosure enable less cache space to be utilized for rollback processing as well as reducing the quantity of data values that are pushed to memory or cache during a rollback process.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. A system for managing rollback in a transactional memory environment, comprising:
   a processor;
   a transactional memory; and
   a transactional memory manager configured to perform a rollback on the transactional memory, the transactional memory manager configured to:
      responsive to detecting a begin transaction directive by the processor, detect an access of a first memory location of the transactional memory not needing rollback and indicate that the first memory location does not need to be rolled back while detecting an access to a second memory location of the transactional memory and indicating that a rollback will be required; and
      responsive to detecting an end transaction directive after the begin transaction directive and a conflict requiring a rollback, omit a rollback of the first memory location while performing rollback on the second memory location.

2. The system of claim 1, wherein the transactional memory manager is configured to, responsive to reading data of the first memory location into a page table, flag the data as not needing rollback.

3. The system of claim 1, wherein the transactional memory manager is configured to, responsive to reading data of the first memory location into a cache, flag the data in the cache as not needing rollback.

4. The system of claim 1, wherein the transactional memory manager is configured to:
   identify a data type of the first memory location; and
   based on the data type, determine whether to flag data of the first memory location as not needing rollback.

5. The system of claim 1, wherein the transactional memory manager is configured to determine whether to flag data of the first memory location as not needing rollback based on a compiler directive.

6. A computer program product for managing rollback in a transactional memory environment, the computer program product comprising:
   a computer readable storage device having computer readable program code embodied therewith, the computer readable program code configured to:
      responsive to detecting a begin transaction directive by the processor, detect an access of a first memory location of the transactional memory not needing rollback and indicate that the first memory location does not need to be rolled back while detecting an access to a second memory location of the transactional memory and indicating that a rollback will be required; and
      responsive to detecting an end transaction directive after the begin transaction directive and a conflict requiring a rollback, omit a rollback of the first memory location while performing rollback on the second memory location.

7. The computer program product of claim 6, wherein the computer readable program code is configured to, responsive to reading data of the first memory location into a page table, flag the data as not needing rollback.

8. The computer program product of claim 6, wherein the computer readable program code is configured to, responsive to reading data of the first memory location into a cache, flag the data in the cache as not needing rollback.

9. The computer program product of claim 6, wherein the computer readable program code is configured to:
   identify a data type of the first memory location; and
   based on the data type, determine whether to flag data of the first memory location as not needing rollback.

10. A system for managing rollback in a transactional memory environment, comprising:
    a processor;
    a transactional memory; and
    a transactional memory manager configured to perform a rollback on the transactional memory, the transactional memory manager configured to:
       responsive to detecting a begin transaction directive by the processor, detect an access of a first memory location of the transactional memory;
       responsive to detecting access of the first memory location, determine whether the first memory location will need rollback in response to detecting a conflict;

responsive to determining that the first memory location will not need rollback, flag the first memory location as not needing rollback; and responsive to detecting an end transaction directive after the begin transaction directive and a conflict requiring a rollback, perform rollback of the transactional memory while omitting a rollback of the first memory location.

11. The system of claim 10, wherein the transactional memory manager is configured to flag the first memory location in a page table.

12. The system of claim 10, wherein the transactional memory manager is configured to flag the first memory location in a cache.

13. The system of claim 10, wherein the transactional memory manager is configured to base whether the first memory location will need rollback on a data type of the first memory location.

* * * * *